United States Patent
Tang et al.

(10) Patent No.: US 9,357,332 B2
(45) Date of Patent: May 31, 2016

(54) NEAR FIELD COMMUNICATION APPLICATION IDENTIFICATION ROUTING IN CARD EMULATION

(75) Inventors: Wayne (Siwei) Tang, San Diego, CA (US); Ash Kapur, Frederick, MD (US); Mohamed Awad, Ladera Ranch, CA (US); Gan Yang, San Diego, CA (US); Deepak Kumar Gauba, San Diego, CA (US); Husein Merchant, San Diego, CA (US); Sherry Smith, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 334 days.

(21) Appl. No.: 13/588,002

(22) Filed: Aug. 17, 2012

(65) Prior Publication Data
US 2013/0331029 A1   Dec. 12, 2013

Related U.S. Application Data

(60) Provisional application No. 61/657,367, filed on Jun. 8, 2012.

(51) Int. Cl.
*H04B 5/00* (2006.01)
*H04W 4/00* (2009.01)

(52) U.S. Cl.
CPC .............. *H04W 4/003* (2013.01); *H04W 4/008* (2013.01)

(58) Field of Classification Search
CPC .............................. H04W 4/003; H04W 4/008
USPC ............................................ 455/41.1; 705/21
See application file for complete search history.

(56) References Cited

U.S. PATENT DOCUMENTS

| 8,811,895 B2* | 8/2014 | Reisgies et al. ............. 455/41.1 |
| 2010/0029202 A1 | 2/2010 | Jolivet et al. |
| 2011/0207401 A1 | 8/2011 | Han et al. |
| 2012/0064828 A1 | 3/2012 | Khan et al. |
| 2012/0109764 A1 | 5/2012 | Martin et al. |
| 2012/0124658 A1* | 5/2012 | Brudnicki et al. ................ 726/9 |
| 2013/0060618 A1* | 3/2013 | Barton et al. ............. 705/14.23 |

(Continued)

FOREIGN PATENT DOCUMENTS

| CN | 101252523 | 8/2008 |
| EP | 2106107 A1 | 9/2009 |

OTHER PUBLICATIONS

Office Action directed to related Chinese Patent Application No. 201310224474X, mailed Nov. 5, 2015; 6 pages.

(Continued)

*Primary Examiner* — Wesley Kim
*Assistant Examiner* — Raj Chakraborty
(74) *Attorney, Agent, or Firm* — Sterne, Kessler, Goldstein & Fox P.L.L.C.

(57) ABSTRACT

A near field communications (NFC) device is disclosed that interacts with other NFC devices to exchange information and/or the data. The NFC device can include a plurality of secure elements each configured to store one or more card emulation instances. Each card emulation instance is associated with an application identification (AID) and a priority value. The NFC device can route communications between another NFC device and plurality of secure elements based on each card emulation instance's associated AID and priority value.

22 Claims, 8 Drawing Sheets

(56) References Cited

U.S. PATENT DOCUMENTS

2013/0124349 A1* 5/2013 Khan .................... G06Q 20/36
 705/21
2013/0225073 A1* 8/2013 O'Donoghue ........ H04W 4/008
 455/41.1

OTHER PUBLICATIONS

English-language abstract of Chinese Patent No. 101252523, published Aug. 27, 2008; 1 page.

European Search Report, dated Sep. 16, 2013, for counterpart European Patent Appl. No. 13002867.3, 3 pages.

Office Action, dated Mar. 29, 2014, for counterpart Korean Patent Appl. No. 10-2013-0066044, 5 pages.

Office Action directed to related Taiwanese Patent Application No. 102118613, mailed on Dec. 10, 2014; 6 pages.

"Identification cards—Contactless integrated circuit(s) cards—Proximity cards—Part 3: Initialization and anticollision," Final Committee Draft, ISO/IEC FCD 14443-3, Jun. 11, 1999; 48 pages.

"Information technology—Telecommunications and information exchange between systems—Near Field Communication—Interface and Protocol (NFCIP-1 )," First Edition, ISO/IEC 18092, Apr. 1, 2004; 66 pages.

"Information Technology—Telecommunications and information exchange between systems—Near Field Communication Interface and Protocol-2 (NFCIP-2)," First Edition, ISO/IEC 21481, Jan. 15, 2005; 12 pages.

"Identification cards—Contactless integrated circuit(s) cards—Proximity cards—Part 4: Transmission protocol," ISO/IEC 14443-4, Jul. 15, 2008; 38 pages.

"Identification cards—Contactless integrated circuit(s) cards—Vicinity cards—Part 3: Anti-collision and transmission protocol," ISO/IEC 15693-3:2009, Apr. 15, 2009; 43 pages.

"NFC Forum: NFC Digital Protocol: Technical Specification, NFC Forum™ Digital 1.0 NFC Forum-TS-Digital Protocol-l. O," Nov. 17, 2010; 175 pages.

European Search Report directed to related European Patent Application No. 13002867.3, dated Feb. 5, 2016, 7 pages.

* cited by examiner

NEAR FIELD COMMUNICATION APPLICATION IDENTIFICATION ROUTING IN CARD EMULATION

CROSS-REFERENCE TO RELATED APPLICATIONS

This application claims priority from U.S. Provisional Patent Application No. 61/657,367, filed Jun. 8, 2012, the disclosure of which is incorporated herein by reference in its entirety.

FIELD

This application relates generally to Near Field Communication (NFC), and more particularly to the routing of wireless communications utilizing the NFC controller.

BACKGROUND

Near field communication (NFC) is a wireless communication protocol generally implemented for establishing wireless communication between devices in close proximity.

NFC devices are being integrated into communication devices, such as mobile devices to provide an example, to facilitate the use of these communication devices in conducting daily transactions. For example, instead of carrying numerous credit cards, credit information provided by these credit cards could be stored onto a NFC device. The NFC device is simply tapped to a credit card terminal to relay the credit information to it to complete a transaction. As another example, a ticketing writing system, such as those used in bus and train terminals, can simply write ticket fare information onto the NFC device instead of providing a ticket to a passenger. The passenger simply taps the NFC device to a reader to ride the bus or the train without the use of a paper ticket. As another example, a security access system, such as those found in commercial office buildings, can simply write security clearance information onto the NFC device instead of providing a security badge to the user. The user simply taps the NFC device to a reader to obtain access.

Generally, NFC requires that NFC devices to be present within a relatively small distance from one another so that their corresponding magnetic fields can exchange information. Typically, a first NFC device transmits or generates a magnetic field modulated with the information, such as the credit, ticket fare, or security information. This magnetic field inductively couples the information onto a second NFC device that is proximate to the first NFC device. The second NFC device can respond to the first NFC device by inductively coupling its corresponding information onto the first NFC device.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
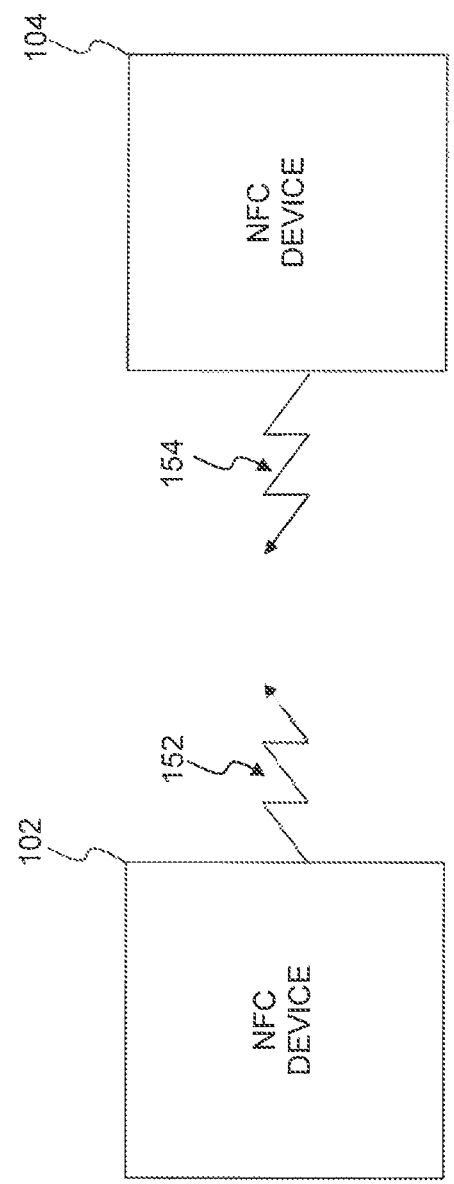
FIG. 1 illustrates a block diagram of a NFC environment according to an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of NFC, those skilled in the relevant art(s) will recognize that the present disclosure may be applicable to other communications that use the near field and/or the far field without departing from the spirit and scope of the present invention. For example, although the present disclosure is to be described using NFC capable communication devices, those skilled in the relevant art(s) will recognize that functions of these NFC capable communication devices may be applicable to other communications devices that use the near field and/or the far field without departing from the spirit and scope of the present disclosure.

An Exemplary NFC Environment

FIG. 1 illustrates a block diagram of a NFC environment according to an exemplary embodiment of the disclosure. A NFC environment 100 provides wireless communication of information, such as one or more commands and/or data, among a first NFC device 102 and a second NFC device 104 that are sufficiently proximate to each other. The first NFC device 102 and/or the second NFC device 104 can be implemented as a standalone or a discrete device or can be incorporated within or coupled to another electrical device or host device such as a mobile telephone, a portable computing device, another computing device such as a laptop, tablet computer, or a desktop computer, a computer peripheral such as a printer, a portable audio and/or video player, a payment system, a security system such as a contactless security badge and badge reading system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the present disclosure. Herein, when incorporated within or coupled to another electrical device or host device, this type of NFC device can be referred to as a NFC capable device.

The first NFC device 102 generates a magnetic field and probes the magnetic field for the second NFC device 104. The first NFC device 102 and the second NFC device 104 can be implemented using, for example, a Type A standard, a Type B standard, a Type F (FeliCa) standard, a vicinity standard, and/or any other standard that will be apparent to those skilled in the relevant art(s) without departing from the spirit and scope of the present disclosure. The Type A and Type B standards are further defined in, for example, the "NFC Forum: NFC Digital Protocol: Technical Specification, NFC Forum™ DIGITAL 1.0 NFC Forum-TS-Digital Protocol-1.0" published Nov. 17, 2011 (hereinafter the "NFC Digital Specification"), ISO/IEC 14443-3, "Identification cards—Contactless integrated circuit(s) cards—Proximity cards—Part 3: Initialization and anticollision," published on Jun. 11, 1999, and/or ISO/TEC 14443-4, "Identification cards—Contactless integrated circuit(s) cards—Proximity cards—Part 4: Transmission protocol," published on Jul. 7, 2008, which are incorporated herein by reference in their entirety. The Type F standard is further defined in, for example, the NFC Digital Specification. The Vicinity standard is further defined in ISO/IEC 15693-3:2009, "Identification cards—Contactless integrated circuit(s) cards—Vicinity cards—Part 3: Anti-collision and transmission protocol," published on Apr. 6, 2009 (hereinafter the "Vicinity Specification"), which is incorporated herein by reference in its entirety.

Upon establishing communication with the second NFC device 104, the first NFC device 102 modulates its corresponding information onto the first carrier wave and generates the first magnetic field by applying the modulated information communication to a first antenna to provide the first information communication 152. The first NFC device 102 continues to apply the first carrier wave without its corresponding information to continue to provide the first information communication 152 once the information has been transferred to the second NFC device 104 in a reader mode of operation. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 can respond to the information by applying its corresponding information to the first carrier wave that is inductively coupled onto the second antenna to provide the second modulated information communication 154 in a target or tag mode of operation.

Further operations of the first NFC device 102 and/or the second NFC device 104 can be described in International Standard ISO/IEC 18092:2004(E), "Information Technology—Telecommunications and Information Exchange Between Systems—Near Field Communication—interface and Protocol (NFCIP-1)," published on Apr. 1, 2004 and International Standard ISO/IEC 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

An Exemplary NFC Device

Figure 2:
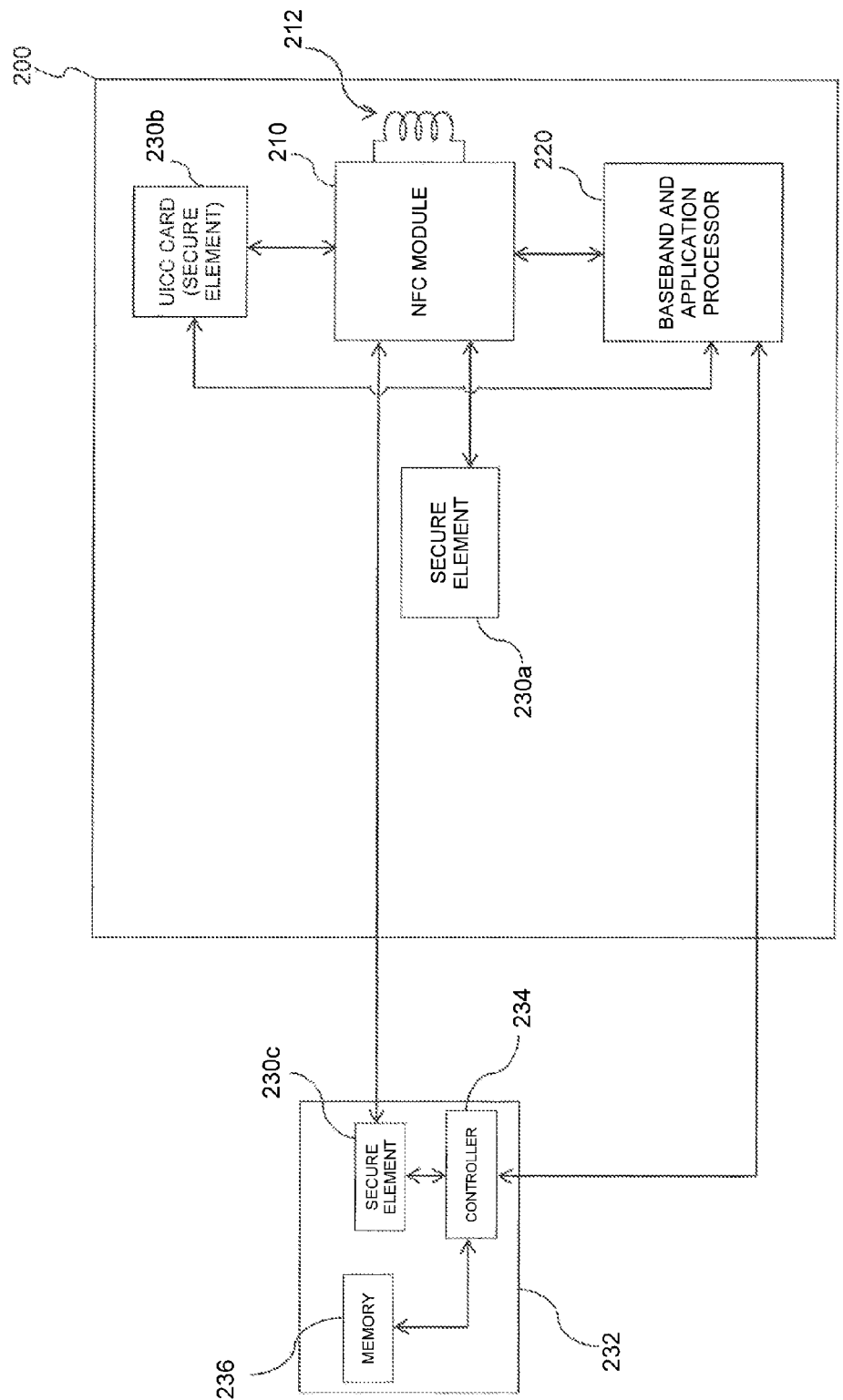
FIG. 2 illustrates a block diagram of an example NFC device according to an exemplary embodiment of the present disclosure.

FIG. 2 illustrates an example NFC device 200 that can be implemented as part of the NFC environment according to an exemplary embodiment of the present disclosure. The NFC device 200 can include NFC module 210, antenna 212, baseband and application processor 220, and one or more secure elements 230. Antenna 212 can be an inductive coupling element, such as a resonant tuned circuit to provide an example. Secure elements 230 can include a secure memory unit and a secure operating system (OS), and can be implemented in various form-factors, including, for example, integrated chip (IC) packages (e.g. secure element 230a), UICC cards (e.g. secure element 230b), and within removable SD/MMC cards 232. The SD/MMC card 232 can include secure element 230c, controller 234, and memory unit 236. Although a single example of each of the various secure element form-factors are illustrated in FIG. 2, the present disclosure should not be limited thereto, and the NFC device 200 can include one or more secure elements 230 implemented in any one of the various exemplary form-factors.

As illustrated in FIG. 2, secure elements 230a and 230b can be implemented within the NFC device 200, while secure element 230c is removably coupled to the NFC device 200 in the form of SD/MMC card 232. Each of the secure elements 230 can be communicatively coupled to the NFC module 210 and to the baseband and application processor 220 via various communication links. The various communication links can be implemented using, for example, a single wire protocol (SWP), the ISO/IEC 7816 standard, a host controller interface (HCI), a network channel interface (NCI) and S2C to provide some examples.

Each secure element 230 can support one or more card emulation instances, including, for example, credit/debit card instances, security badge instances, transportation (fare) card instances, retailer rewards card instances, etc. Further, the secure elements 230 can include one or more of a particular card emulation instance and/or combinations of the card emulation instances. For example, the secure element 230a can include three credit card instances and two transportation card instances, while secure element 230b can include one security badge instance and two credit card instances.

Each of the various card emulation instance types are associated with an application identification (AID), which are used to route communications between the various secure elements 230. For example, the credit card instances used for monetary transactions can be associated with AID-1, while security badge instances used for security access can be associated with AID-2.

Similarly, NFC terminals (e.g., point-of-sale (POS) terminals, security access terminals, or the like) have corresponding AID associations. For example, a POS terminal used in monetary transactions can be associated with AID-1, while a security access terminal can be associated with AID-2. During operation, the NFC terminals can establish communications with the NFC module 210 utilizing the corresponding AID (e.g., a PDS terminal can utilize AID-1).

In an exemplary embodiment, the baseband and application processor 220 can include suitable logic, circuitry, and/or code that can be configured to control overall operation and/or configuration of the NFC device 200.

Figure 3:
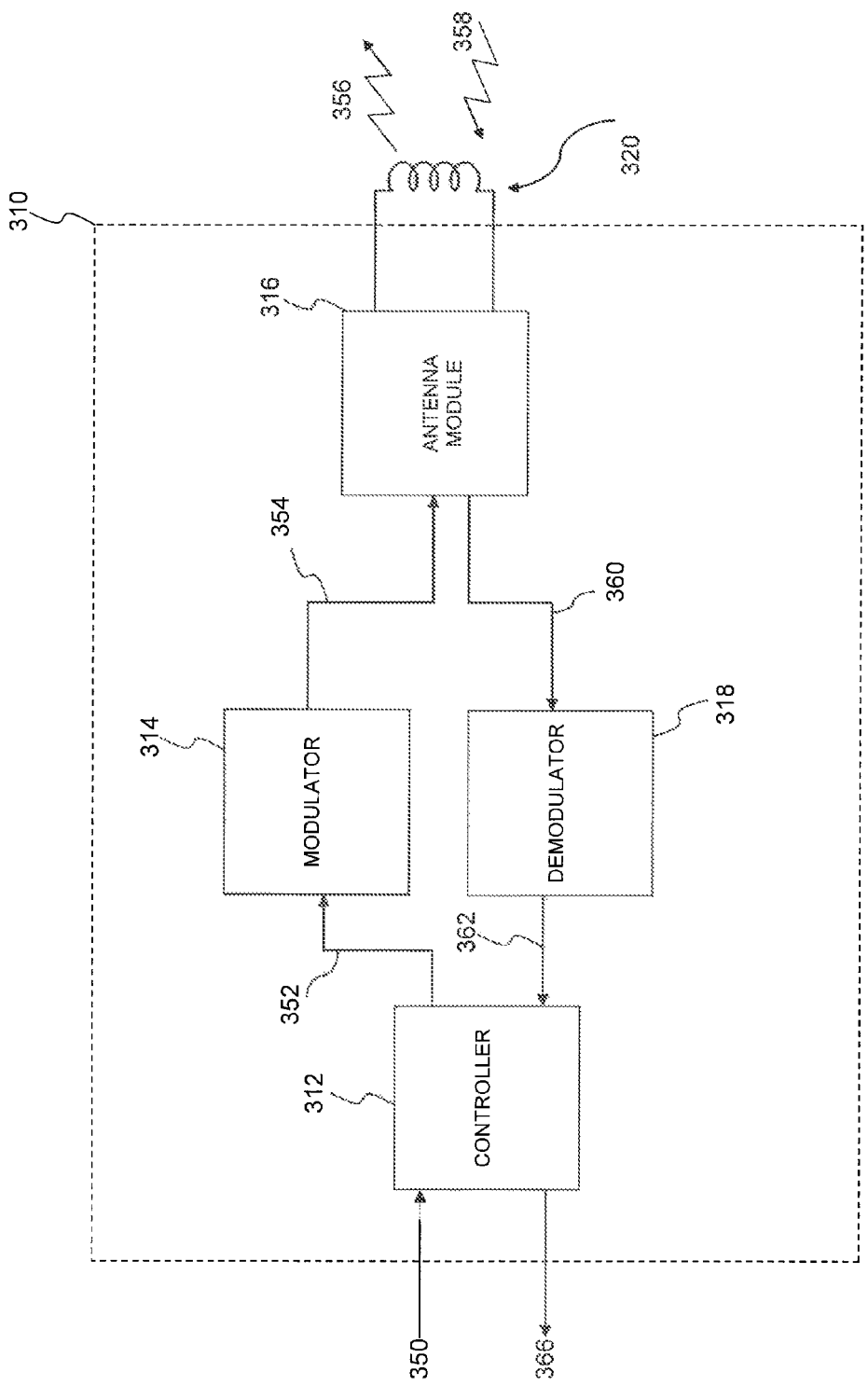
FIG. 3 illustrates a block diagram of an example NFC module according to an exemplary embodiment of the present disclosure.

FIG. 3 illustrates a block diagram of a NFC module 310 according to an exemplary embodiment of the present disclosure. The NFC module 310 can include suitable logic, circuitry, and/or code that can be configured to wirelessly transmit and/or receive information, such as one or more commands and/or data, via an antenna 320. The NFC module 310 can also include one or more look-up-tables (LUT) (not shown in FIG. 3).

The NFC module 310 can include a controller module 312, a modulator module 314, an antenna module 316, and a demodulator module 318. The NFC module 310 can represent an exemplary embodiment of the NFC module 210 of FIG. 2. Similarly, the NFC module 310 can represent an exemplary embodiment of the first NFC device 102 and/or the second NFC device 104 of FIG. 1.

The controller module 312 controls overall operation and/or configuration of the NFC module 310. The controller module 312 receives information 350 from one or more data storage devices, such as one or more secure elements (e.g., secure elements 230 of FIG. 2), one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium can include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 312 can also receive the information 350 from a user interface such as a touch-screen display, an alphanumeric keypad, a microphone, a mouse, a speaker, any other suitable user interface that will be apparent to those skilled in the relevant art(s) without departing from the spirit and scope of the disclosure to provide some examples. The controller module 312 can further receive the information 350 from other electrical devices or host devices coupled to the NFC module 310.

Typically, the controller module 312 provides the information 350 as transmission information 352 for transmission to another NFC capable device. However, the controller module 312 can also use the information 350 to control the overall operation and/or configuration of the NFC module 310. For example, the controller module 312 can issue and/or execute the one or more commands in accordance with the data, if appropriate, to control operations of the NFC module 310, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the disclosure, of other NFC capable devices.

The controller module 312 can also route the information 350 based on a corresponding AID included with reception information 362 demodulated by the demodulator module 318. Specifically, the controller module 312 can determine one or more appropriate secure elements in which to retrieve information by utilizing information stored in one or more LUTs and an AID included with the reception information 362. For example, the controller module 312 can determine the one or more secure elements (e.g., secure elements 230 of FIG. 2) in which information requested by another NFC capable device (e.g., NFC terminals such as point-of-sale (POS) terminals, security access terminals, or the like) is stored. The determination can be based on information associated with the AID and stored in a corresponding LUT, including one or more secure elements in which one or more card emulation instances are stored, and/or one or more priority values associated with each of the card emulation instances, respectively.

The controller module 312 can also examine packets of the information 350 and/or the reception information 362. Packets generally include control information and payload data. The control information is generally found in packet headers and/or trailers, with the payload data in between. For example, the controller module 312 can examine packets of the reception information 362 to determine one or more AIDs that can be included within the reception information 362. The one or more IDs can be included in the control information (i.e., within the packet headers and/or trailers) and/or the payload data.

Additionally, the controller module 312 can perform other functionality as described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

The modulator module 314 modulates the transmission information 352 onto a carrier wave, such as a radio frequency carrier wave having a frequency of approximately 13.56 MHz to provide an example, using any suitable analog or digital modulation technique to provide a modulated information communication as transmission information 354. The suitable analog or digital modulation technique can include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The modulator module 314 can continue to provide the carrier wave to provide an unmodulated information communication as the transmission information 354 once the transmission information 352 has been transferred to another NFC capable device. Alternatively, the modulator module 314 can cease to provide the transmission information 354 once the transmission information 352 has been transferred to another NFC capable device.

The antenna module 316 applies the transmission information 354 to an inductive coupling element (e.g., contactless antenna 320), such as a resonant tuned circuit to provide an example, to generate a magnetic field to provide a transmitted information communication 356. Additionally, another NFC capable device can inductively couple a received communication signal 358 onto the inductive coupling element to provide a recovered communication signal 360. For example, this other NFC capable device can respond to the information by modulating its corresponding antenna with its corresponding information to modulate the carrier wave to provide the received communication signal 358. As another example, this other NFC capable device can modulate its corresponding information onto its corresponding carrier wave and generate its corresponding magnetic field by applying this modulated information communication to its corresponding antenna to provide the received communication signal 358.

The demodulator module 318 demodulates the recovered communication signal 260 using any suitable analog or digital modulation technique to provide reception information 262. The suitable analog or digital modulation technique can include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

Typically, the controller module 312 provides the reception information 262 as recovered information 266 to the data storage device(s), the user interface, and/or other electrical devices or host devices. However, the controller module 312 can also use the reception information 262 to control the overall operation and/or configuration of NFC module 310. The reception information 262 can include one or more commands and/or data. The controller module 312 can issue and/or execute the one or more commands to control the overall operation and/or configuration of NFC module 310. For example, the controller module 312 can issue and/or execute the one or more commands in accordance with the data, if appropriate, to control operations of NFC module 310, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the disclosure, of other NFC capable devices.

An Exemplary Look-Up-Table (LUT)

In an exemplary embodiment of the present disclosure, information associated with an AID can be stored in a corresponding LUT. The LUT corresponding to an AID can be referenced and used by the NFC module 210 for determining the secure element in which a particular card emulation instance is stored. In particular, the one or more LUTs can include data related to corresponding AIDs, including one or more card emulation instances and corresponding secure elements 230 in which the one or more card emulation instances are stored. The LUTs can also include predetermined priorities associated with each of the card emulation instances.

For example, the LUT for a particular AID (e.g., AID-1) can include a listing of each card emulation instance, a listing of corresponding secure elements 230 in which respective instances are stored, and a listing of a corresponding priority for each of the card emulation instances. An exemplary LUT is shown below in Table 1. For the purpose of this discussion, the exemplary LUT corresponds to the AID-1 LUT. LUTs corresponding to other AIDs can be implemented in a similar manner.

TABLE 1

| | AID-1 | Secure Element | Priority |
|---|---|---|---|
| Card Emulation Instances | Credit Card 1 | 1 | 3 |
| | Credit Card 2 | 1 | 2 |
| | Credit Card 3 | 2 | 1 |
| | Credit Card 4 | 1 | 4 |
| | Credit Card 5 | 3 | 5 |

In the example shown above in Table 1, five credit cards instances are associated with AID-1, and each of the credit card instances are associated with a secure element and a priority value. For example, credit card 3 is stored in secure element 2 (e.g., secure element 230b) and associated with priority value 1.

In an exemplary embodiment of the present disclosure, the priorities associated with each of the card emulation instances can be preset by a user prior to the NFC device 200 establishing communication with another NFC device, for example, a NFC terminal. For example, upon establishing communication with another NFC device, the NFC device 200 selects the credit card emulation instance with the priority value 1. In a case where the priority value 1 credit card emulation instance is unavailable (e.g., that type of credit card is not accepted by the POS terminal, the credit card information is expired/inaccurate, or the like), the NFC device 200 can select the credit card emulation instance with the next highest priority value (e.g., Credit Card 2, having priority value 2), and so on until the selected credit card instance can complete the transaction.

In contrast, in another exemplary embodiment of the present disclosure, the priorities associated with each of the card emulation instances can set by the user following the NFC device 200 establishing communication with another NFC device. For example, the user can be prompted to select a credit card instance from one of the five credit card instances associated with AID-1 after the NFC device 200 has established communication with another NFC device. The user can be prompted via, for example, a user interface of the NFC device 200. Following being prompted, the user can select a credit card instance (e.g., Credit Card 4). In this case, the user's selection assigns the highest priority value to the selected credit card instance.

In another exemplary embodiment of the present disclosure, the priorities associated with each of the card emulation instances can be preset by a user and the user can be prompted to confirm or override the preset priorities. For example, upon establishing communication with the other NFC device, the NFC device 200 can prompt the user to confirm whether the credit card emulation instance with priority value 1 should be used for the transaction. The prompt can also include a timer that, upon expiration, automatically selects the credit card emulation instances according to the associated preset priority values. Further, the user can override the preset priority values by selecting a credit card emulation instances other than the credit card emulation instance associated with highest priority value.

In another exemplary embodiment, the priorities associated with each of the card emulation instances can be automatically set by the NFC device 200 based on various characteristics, such as the time of day, the Global Positioning System (GPS) location, the dollar amount of a potential transaction, or any combination of these and other characteristics as will be recognized by those skilled in the relevant art(s).

For example, a card emulation instance may be set to have priority value 1 when the NFC device 200 is located within a specific store based on the GPS location, or the card emulation instance may be set to have priority value 1 when the transaction exceeds a predetermined dollar amount.

In an exemplary embodiment where only a single card emulation instance is associated with a particular AID, the single card emulation instance can be assigned the highest priority value (e.g., priority value 1) by default.

Although the various exemplary embodiments described above with respect to the exemplary LUT describe the selection of credit card emulation instances, the exemplary embodiments are not limited thereto, and such exemplary embodiments can be applied to security badge instances, transportation (fare) card instances, retailer rewards card instances, and/or any other suitable instance that will be apparent to those skilled in the relevant art(s) without departing from the spirit and scope of the present disclosure.

Operation of an Exemplary NFC Module

In operation, and with reference to FIG. 2, when the NFC module 210 of the NFC device 200 is brought into close proximity to a NFC terminal (e.g., a POS terminal, security terminal, or the like), communications between the terminal and the NFC device 200 can be routed to an appropriate secure element 230 of the NFC device 200 based on a corresponding AID. Herein, routing can include the NFC module 210 retrieving data stored on an appropriate secure element 130 based on communications between the NFC module 210 and the terminal, as well as directing communications between the terminal and the secure elements.

For the purpose of this discussion, the interaction with a POS terminal utilized for monetary transactions will be discussed for exemplary purposes. In particular, when the NFC device 200 is brought into close proximity with the POS terminal (e.g., a terminal used for monetary transactions), it is determined that the secure elements 230 associated with, for example, AID-1 (e.g., the AID associated with credit card instances) are to be used for the current transaction. Using information stored in the LUT associated with AID-1, the communications between the POS terminal and the NFC device 200 can be routed to a particular secure element 230 based on the preset priority values.

For example, with reference to Table 1, because credit card 3 has been assigned priority value 1, the communications will be routed to secure element 2 and utilize the credit card 3 emulation instance. In a case where the credit card 3 emulation instance is unavailable (e.g., that type of credit card is not accepted by the POS terminal, the credit card information is expired/inaccurate, or the like), the communications will be routed to the credit card emulation instance with the next highest priority value. That is, the communications will be routed to secure element 1 and utilize the credit card 2 emulation instance.

An Exemplary Routing Architecture

Figure 4:
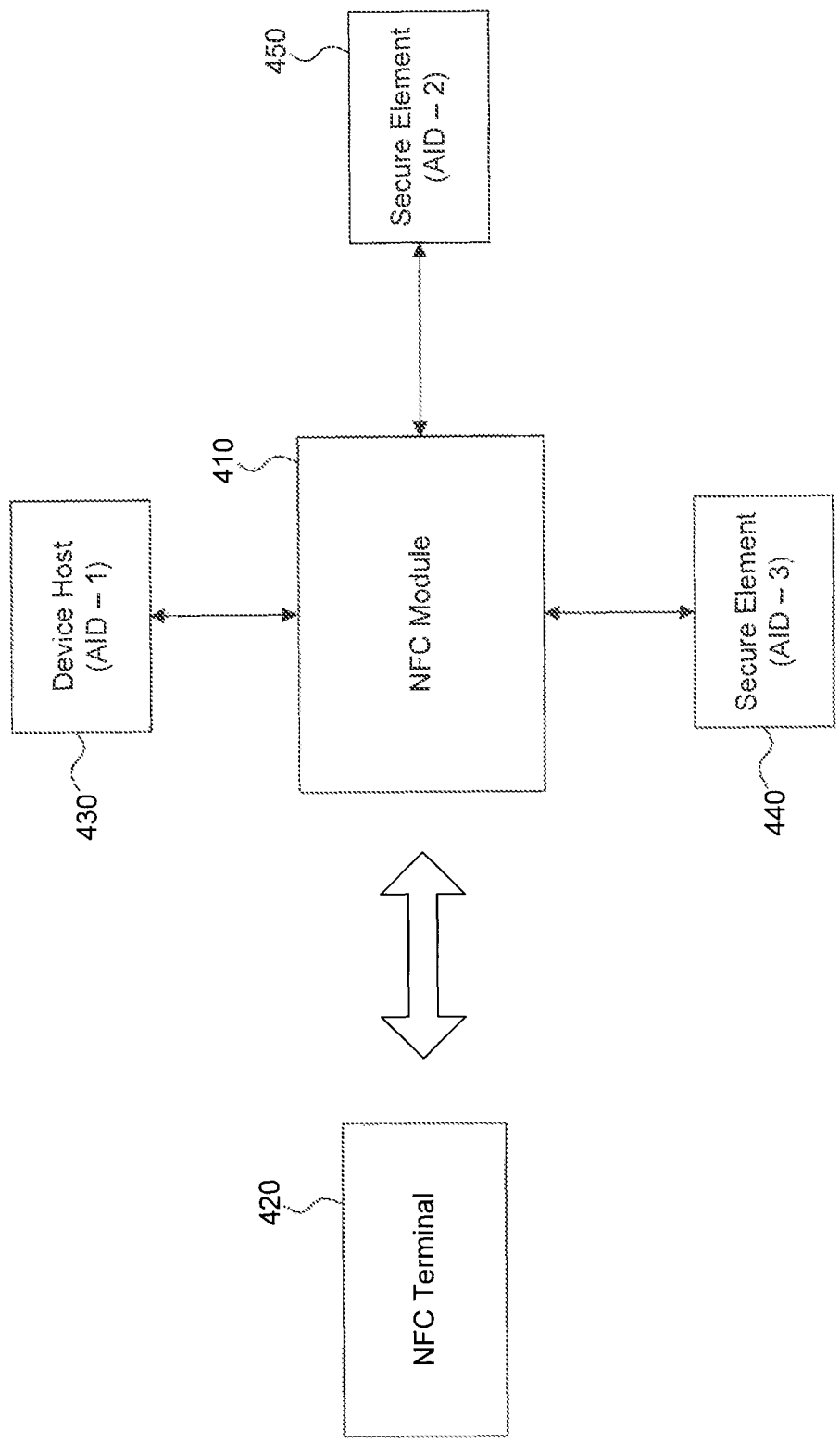
FIG. 4 illustrates a block diagram of an example NFC AID routing architecture according to an exemplary embodiment of the present disclosure.

FIG. 4 illustrates a block diagram of a NFC AID routing architecture 400 of an exemplary embodiment of the present disclosure. In particular, FIG. 4 illustrates an exemplary embodiment in which a NFC terminal 420, such as a POS terminal or the like, communicates with a NFC module 410 utilizing the NFC wireless protocol. The NFC module 410 routes the communications between the NFC terminal 420 and various secure elements (Device Host 430, secure element 440 and secure element 450) based on associated AIDs in a similar process as discussed above. For example, AID-1, AID-2, and AID-3, can be associated with card emulation instances stored in a secure element off of the Device Host 430, in secure element 440, and in secure element 450, respectively. Communications associated with those card emulation instances can then be directed to the appropriate secure element based on the AIDs.

Figure 5:
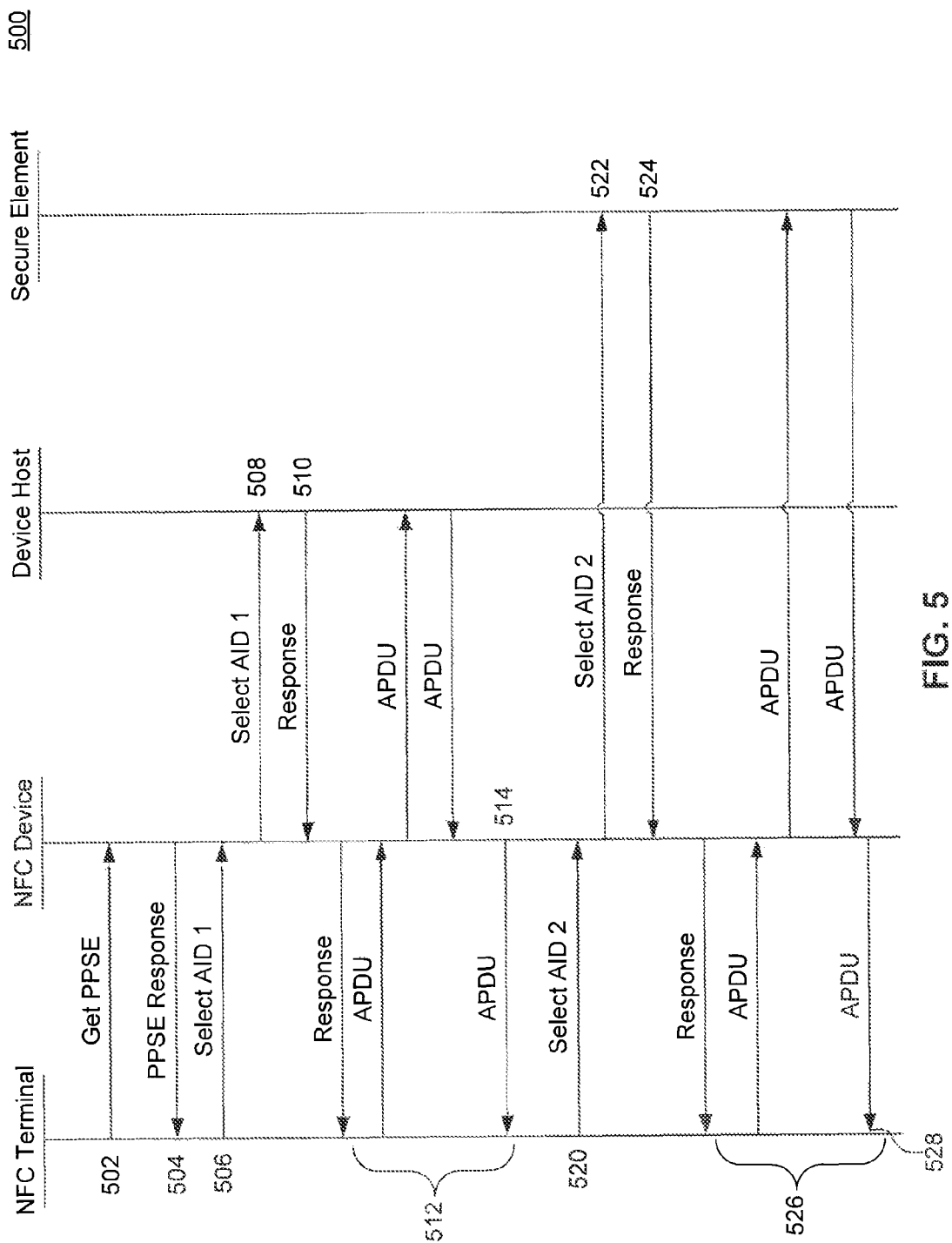
FIG. 5 illustrates a flowchart of a method for NFC AID routing according to an exemplary embodiment of the present disclosure.

FIG. 5 illustrates a flowchart 500 of a method of AID routing in an exemplary embodiment of the present disclosure. The method of flowchart 500 is described with continued reference to NFC device 200 of FIG. 2.

The method of flowchart 500 begins at step 502, where the NFC terminal requests a list of AIDs utilized by the NFC device 200 from the NFC module 210.

After step 502, the flowchart 500 transitions to step 504, where the NFC module 210 provides a list of AIDs utilized by the NFC device 200.

After step 504, the flowchart 500 transitions to step 506, where the NFC terminal selects the appropriate AID for the current transaction and informs the NFC module 210 of the selection. For example, in the case where the NFC terminal is a POS terminal used for monetary transactions, the NFC terminal can select, for example AID-1.

In some situations, the NFC module 210 can select the appropriate AID for the current transaction and informs the NFC terminal of the selection.

After step 506, the flowchart 500 transitions to step 508, where the NFC module 210 routes the communication to the appropriate secure element 130. In the example illustrated in FIG. 5, the secure element is located off of the Device Host (e.g., secure element 430 in FIG. 4). Therefore, the NFC module 210 routes the communication to the appropriate secure element (e.g., a MicroSD card connected to the Host) via the Device Host.

After step 508, the flowchart 500 transitions to step 510, where the NFC module 210 receives the information from the secure element 130 and transmits the information to the NFC terminal.

After step 510, the flowchart 500 transitions to step 512, where the NFC terminal and the NFC module 210 exchange information to necessitate the current transaction. For example, the NFC terminal and the NFC module 210 exchange information to complete the monetary transaction.

After step 512, process can terminate at step 514.

The flowchart 500 also illustrates a similar exemplary process which can begin at step 520. This exemplary process assumes that the exchange of AIDs utilized by the NFC device 200 has been performed (e.g., steps 502 and 504) prior to step 520. At step 520, the NFC terminal selects the appropriate AID for the current transaction and informs the NFC module 210 of the selection. For example, the NFC terminal can select AID-2.

After step 520, the flowchart 500 transitions to step 522, where the NFC module 510 routes the communication to the appropriate secure element 230. In the second example illustrated in FIG. 5, the secure element is connected off of the NFC module 210 (e.g., secure element 440 in FIG. 4; secure element 230a or 230b in FIG. 2). In this case, the NFC module 210 routes the communication to the appropriate secure element 230 without involvement of the Device Host. That is, the NFC device 200 can route the communications directly to the appropriate secured element rather than routing to the secured element via the Device Host. By not involving the Device Host in the routing process, the NFC device 200 can route the communications to the secure elements while operating in a low-power mode (i.e., the communication routing can be performed without waking the Device Host from a low-powered sleep state).

After step 522, the flowchart 500 transitions to step 524, where the NFC module 210 receives information from the secure element 230 and transmits the information to the NFC terminal.

After step 524, the flowchart 500 transitions to step 526, where the NFC terminal (e.g., NFC terminal 420) and the NFC module 210 exchange information to necessitate the current transaction.

Figure 6:
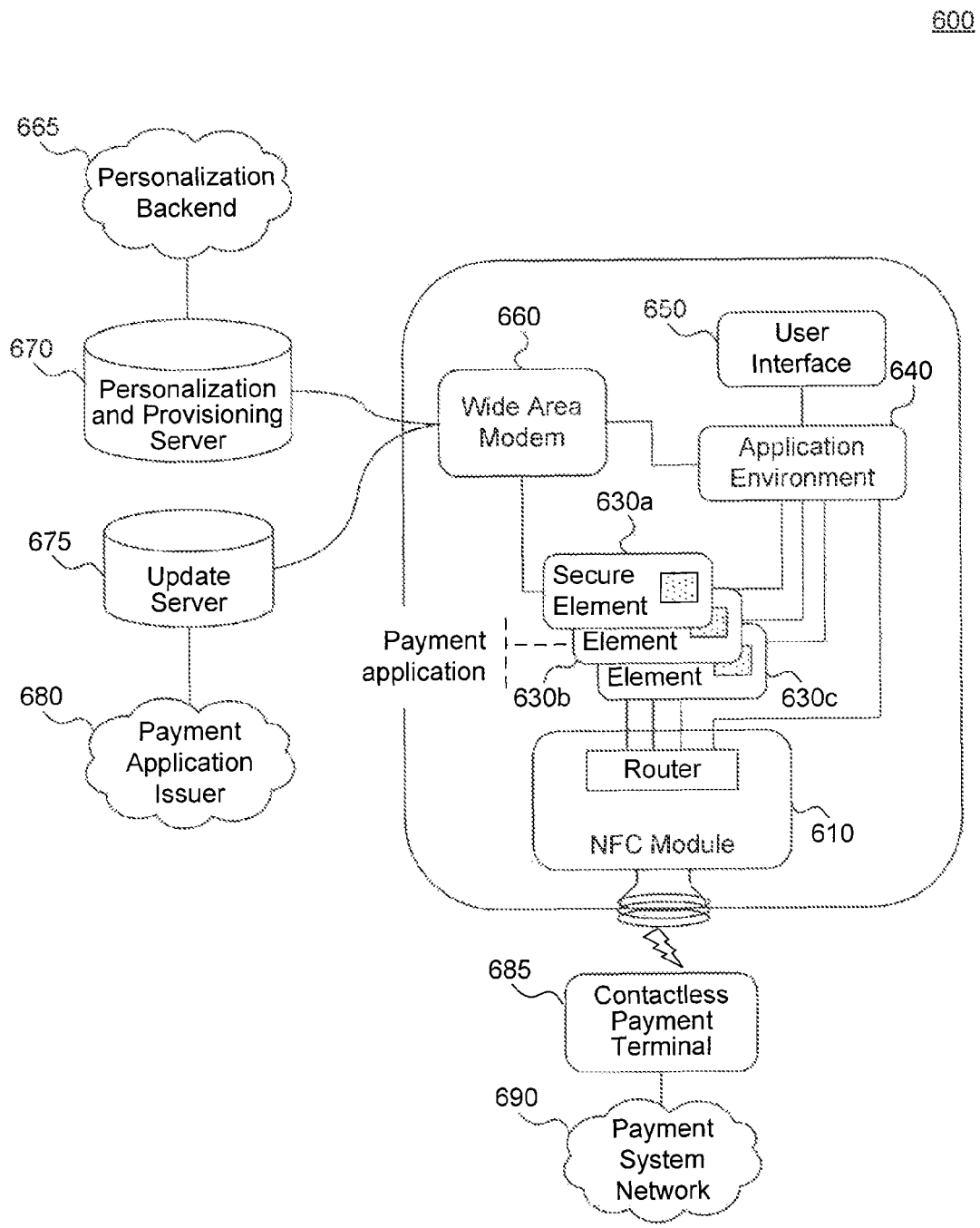
FIG. 6 illustrates a block diagram of an example NFC device according to an exemplary embodiment of the present disclosure.

After step 526, the process can terminate at step 528,

FIG. 6 illustrates a block diagram of an example NFC device 600 according to an exemplary embodiment of the present disclosure. The NFC 600 can include a NFC module 610, secure elements 630a-630c, application environment 640, user interface 650, and wide area modem 660. For illustrative purposes, the example NFC device 600 is discussed with reference to a POS terminal utilizing credit card emulation instances for credit card transactions, but should not be limited to thereto.

The wide area modern 660 can be configured to establish communication between the NFC device 600 and a wide area network (WAN), which can include a personalization backend 665, personalization and provision server 670, update server 675, and payment application issuer 680. The various components of the WAN can be utilized by the NFC device 600, via the wide area modem 660, to configure the various card emulation instances stored in the one or more secure elements 630. In particular, the personalization backend 665 and personalization and provisioning server 670 can manage user information associated with each of the card emulation instances. The update server 675 and payment application issuer 680 can manage account information associated with each of the card emulation instances. For example, for credit card emulation instances, the update server 675 and payment application issuer 680 can manage credit card account information, balance information, credit card transaction information, or the like. The various card emulation instances can be created, modified, and/or deleted by a user via the user interface 650 by accessing information obtained from the various components of the WAN. Further, in operation, the NFC device 600 can wirelessly communicate with a contactless payment terminal 685 to perform a credit card transaction. The contactless payment terminal 685 may communicate with a payment system network 690 to necessitate the transaction. The payment system network 690 can be, for example, associated with a specific credit card issuer, and provide information to complete the credit card transaction.

Figure 7:
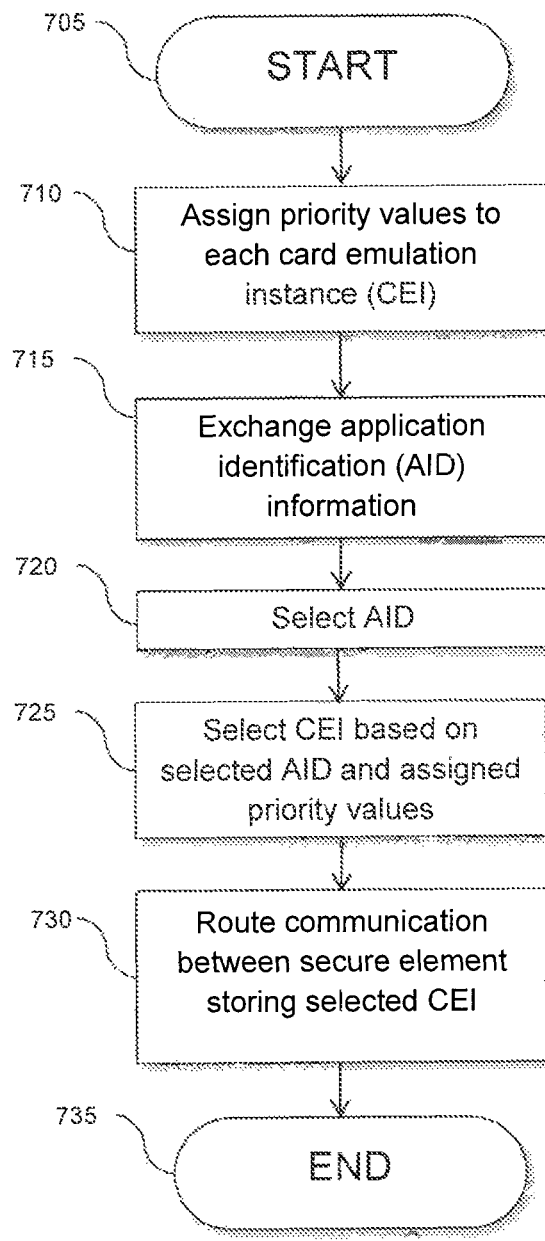
FIG. 7 illustrates a flowchart of a method for NFC AID routing according to an exemplary embodiment of the present disclosure.

FIG. 7 is a flowchart 700 of exemplary operational steps for routing communications between a NFC device and another NFC device, according to an exemplary embodiment of the present disclosure. The present disclosure is not limited to this operation description. Rather, it will be apparent to persons skilled in the relevant art(s) from the teachings herein that other operational steps are within the scope and sprit of the present disclosure. Further, it should be noted that some of the steps of flowchart 700 do not have to occur in the order shown in FIG. 7. The following discussion describes the steps in FIG. 7.

The method of flowchart 700 begins at step 705 and transitions to step 710, where the NFC module 210 of the NFC device 200 assigns priority values to each card emulation instances that is stored within the various secure elements of the NFC Device 200. For example, the priority values can be preset by a user prior to establishing wireless communication with the other NFC device. However, the NFC device 200 is not limited to a configuration in which the priority values are preset. Rather, the priority values can be set following the establishment of the wireless communications. For example, the priority values can be set in response from a prompt from the other NFC device to select a card emulation instance to complete the transaction.

After step 710, the flowchart 700 transitions to step 715, where application identification (AID) information is exchanged between the NFC device 200 and the other NFC device. For example, in response to a request from the other NFC device, the NFC module 210 can provide a list of AIDs utilized by the NFC device 200.

After step 715, the flowchart 700 transitions to step 720, where an AID is selected by the other NFC device. For example, the other NFC device can select an appropriate AID for the current transaction and notify the NFC module 210.

After step 720, the flowchart 700 transitions to step 725, where a card emulation instance is selected for the current transaction based on the selected AID and the assigned priority values. For example, the NFC module 210 can select the appropriate card emulation instance for the transaction by determining all of the card emulation instances associated with the selected AID and the corresponding secure elements storing such card emulation instances. The NFC module 210 can then select the card emulation instance with the highest priority value.

After step 725, the flowchart 700 transitions to step 730, where the wireless communication between the NFC device and the other NFC device are routed to the secure element that stores the selected card emulation instance. For example, communications from the other NFC device can be routed to the secure element by the NFC module 210 to access the selected card emulation instance so as to complete the current transaction.

After step 730, the flowchart 700 transitions to step 735, where the flowchart 700 ends.

Figure 8:
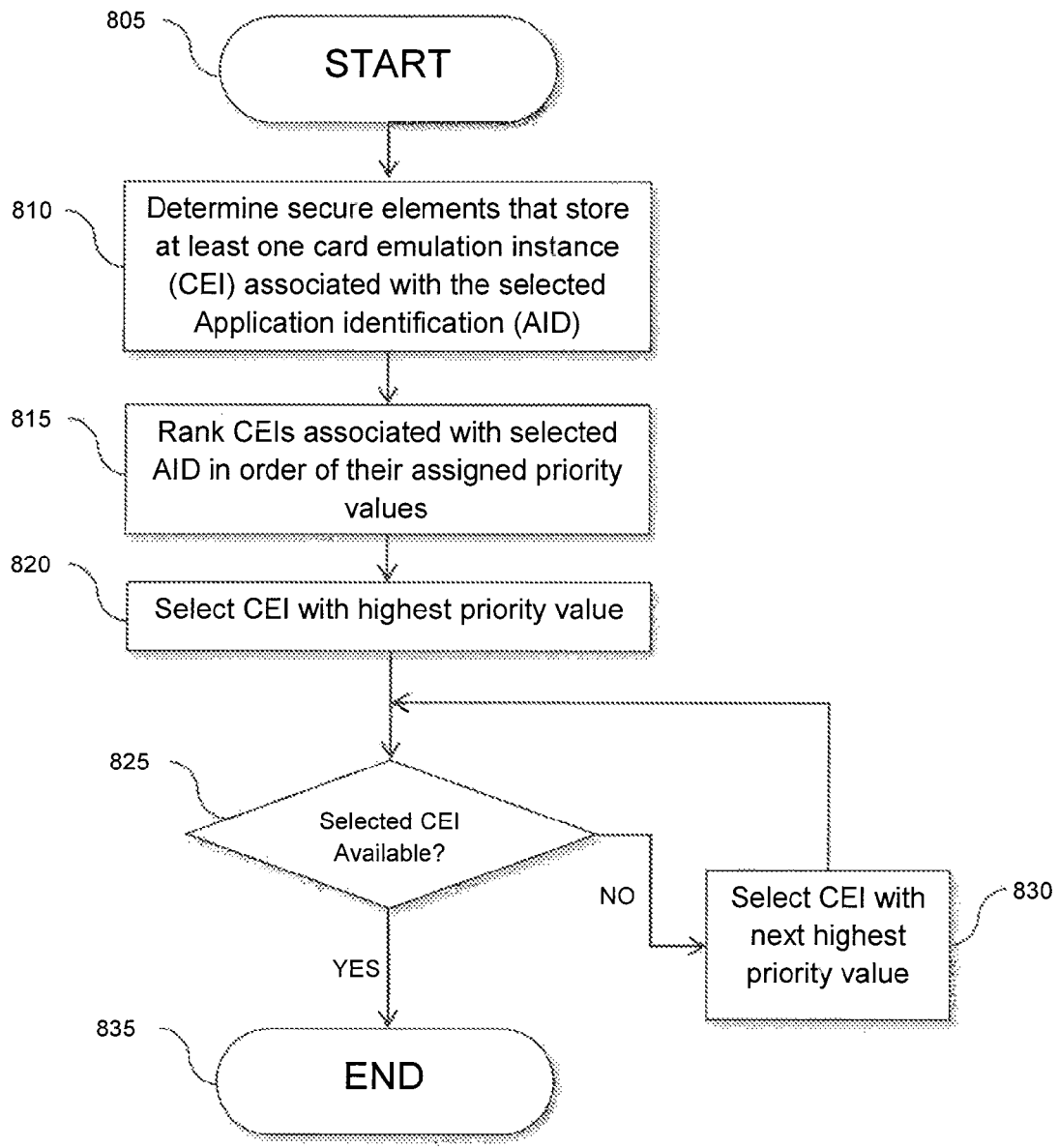
FIG. 8 illustrates a flowchart of a method for NFC AID routing according to an exemplary embodiment of the present disclosure.

FIG. 8 is a flowchart 800 of exemplary operational steps for routing communications between a NFC device and another NFC device, according to an exemplary embodiment of the present disclosure. The present disclosure is not limited to this operation description. Rather, it will be apparent to persons skilled in the relevant art(s) from the teachings herein that other operational steps are within the scope and sprit of the present disclosure. Further, it should be noted that some of the steps of flowchart 800 do not have to occur in the order shown in FIG. 8.

The following discussion describes the steps in FIG. 8 with reference to the operational steps illustrated in FIG. 7. In particular, the operational steps of flowchart FIG. 8 illustrate the selection of a card emulation instance similar to step 725 of FIG. 7.

The method of flowchart 800 begins at step 805 and transitions to step 810, where the NFC device determines the secure elements that store at least one card emulation instances associated with a selected AID. For example, the NFC module 210 can receive a selected AID from the other NFC device, and then can determine all of the secure elements that store one or more card emulation instances associated with the selected AID.

After step 810, the flowchart 800 transitions to step 815, where the NFC device can rank the card emulation instances based on their corresponding priority values. For example, the NFC module 210 can arrange the card emulation instances associated with the selected AID in order of decreasing priority. Further, the card emulation instances can be stored in a LUT with corresponding priority values and information identifying a corresponding secure element in which each card emulation instance is stored.

After step 815, the flowchart 800 transitions to step 820, where the NFC device selects the card emulation instance with the highest priority value. For example, the NFC module 210 can select the card emulation instance having the highest priority value. Further, in an example embodiment where the card emulation instances are stored in a LUT, the NFC module 210 can refer to the LUT to make the selection.

After step 820, the flowchart 800 transitions to step 825, where the NFC device determines whether the selected card emulation instance is available for use in the current transaction. The card emulation instance can be unavailable for various reasons, including, for example, the card emulation instance is not accepted by the other NFC device and/or the card emulation instance has expired.

For example, in an exemplary embodiment where the card emulation instances represent credit card information, the NFC module 210 can determine whether the represented type of credit card is accepted by the other NFC device, whether the credit card information is current and/or accurate (i.e., the information is not expired or incorrect), or the like.

If it is determined that the selected card emulation instance is unavailable (NO at step 825), the flowchart 800 transitions to step 830, where the NFC device (e.g., the NFC module 210) selects the card emulation instance with the next highest priority value. After step 830, the flowchart 800 returns to step 825, where the NFC device determines whether the newly selected card emulation instance is available for use in the current transaction in a similar process discussed above.

Otherwise (YES at step 825), the flowchart 800 transitions to step 835, where the flowchart 800 ends.

CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A Near Field Communication (NFC) device, comprising:
   a plurality of secure elements configured to store a plurality of card emulation instances, each of the plurality of card emulation instances being associated with a corresponding application identification (AID) from among a plurality of AIDs and a corresponding priority value from among a plurality of priority values, at least one AID from among the plurality of AIDs being associated with the plurality of card emulation instances, the plurality of card emulation instances being stored by more than one of the plurality of secure elements; and
   an NFC module configured to:
     select a card emulation instance from among the plurality of card emulation instances that is associated with AID information that is received from a second NFC device, the AID information identifying an AID from among the plurality of AIDs,
     wherein the NFC module is configured to select the card emulation instance having a highest priority value from among the plurality of priority values when the plurality of card emulation instances is associated with the identified AID, and
     route wireless communications between the second NFC device and a secure element from among the plurality of secure elements that is associated with the selected card emulation instance to establish access to the selected card emulation instance.

2. The NFC device of claim 1, wherein the NFC module is further configured to select the card emulation instance having a next highest priority value from among the plurality of priority values when the card emulation instance having the highest priority value is unavailable.

3. The NFC device of claim 1, wherein the corresponding priority value for each of the plurality of card emulation instances is set by a user prior to establishing wireless communication with the second NFC device.

4. The NFC device of claim 1, wherein the corresponding priority value for each of the plurality of card emulation instances is set by a user following receipt of the AID information from the second NFC device.

5. The NFC device of claim 1, wherein the NFC module comprises:
   a memory that stores a plurality of look-up-tables (LUTs) having the plurality of AIDs, the plurality of priority values, and secure element information indicative of corresponding secure elements from among the plurality of secure elements in which the plurality of AIDs is stored, each LUT from among the plurality of LUTs corresponding to a different AID from among the plurality of AIDs, and
   wherein the NFC module is configured to select the card emulation instance using a LUT from among the plurality of LUTs that is associated with the identified AID.

6. The NFC device of claim 1, wherein the plurality of card emulation instances comprises:

monetary transaction information;
electronic ticketing information;
security clearance information; or
personal identification information.

7. The NFC device of claim 1, wherein the NFC module comprises:
an antenna module, including an indicative coupling element, configured to generate a recovered communication signal from a received communication signal inductively coupled onto the inductive coupling element from the second NFC device; and
a controller module configured to receive the recovered communication signal and to route the recovered communication signal to the secure element.

8. The NFC device of claim 7, wherein the controller module is configured to examine a packet of the recovered communication signal to determine the identified AID.

9. A method of routing wireless communications between a plurality of secure elements of a Near Field Communication (NFC) device and a second NFC device, the plurality of secure elements being configured to store a plurality of card emulation instances, the method comprising:
assigning a priority value from among a plurality of priority values to each of the plurality of card emulation instances stored in the plurality of secure elements;
receiving application identification (AID) information from the second NFC device;
selecting an AID from among a plurality of AIDs based on the AID information, at least one AID from among the plurality of AIDs being associated with the plurality of card emulation instances, the plurality of card emulation instances being stored by more than one of the plurality of secure elements;
selecting a card emulation instance from among the plurality of card emulation instances that is associated with the selected AID, the card emulation instance having a highest priority value from among the plurality of priority values being selected when the plurality of card emulation instances is associated with the selected AID; and
routing the wireless communications between a secure element from among the plurality of secure elements that is associated with the selected card emulation instance and the second NFC device.

10. The method of claim 9, wherein the selecting the card emulation instance comprises:
determining which of the plurality of secure elements currently store the plurality of card emulation instances that is associated with the selected AID; and
determining which secure element from among the determined plurality of secure element currently stores a card emulation instance that is associated with the selected AID having the highest priority value.

11. The method of claim 10, wherein the selecting the card emulation instance further comprises:
determining another card emulation instance from among the plurality of card emulation instances that is associated with the selected AID that has a next highest priority value from among the plurality of priority values when the card emulation instance having the highest priority value is unavailable.

12. The method of claim 9, wherein the assigning priority values is performed prior to the receiving the AID information.

13. The method of claim 9, wherein the assigning the priority values is performed after the receiving the AID information.

14. The method of claim 9, wherein the selecting the card emulation instance comprises:
selecting the card emulation instance from a plurality of look-up-tables (LUTs) corresponding to the selected AID, the plurality of LUTs including the plurality of AIDs, the plurality of priority values and secure element information indicative of corresponding secure elements from among the plurality of secure elements in which the plurality of AIDs is stored, each LUT from among the plurality of LUTs corresponding to a different AID from among the plurality of AIDs.

15. The method of claim 9, wherein the assigning the priority values comprises:
automatically assigning the card emulation instance the highest priority value if the card emulation instance is the only card emulation instance associated with the selected AID.

16. The method of claim 9, wherein the AID information comprises:
a list of one or more AIDs associated with each of the plurality of card emulation instances.

17. A Near Field Communication (NFC) device, comprising:
a plurality of secure elements, each secure element from among the plurality of secure elements storing a card emulation instance associated with a first application identification (AID) from among a plurality of card emulation instances and a priority value from among a plurality of priority values, at least one AID from among the plurality of AIDs being associated with the plurality of card emulation instances, the plurality of card emulation instances being stored by more than one of the plurality of secure elements from among the plurality of secure elements; and
an NFC module configured to:
compare a second AID received from a second NFC device with the first AID to identify the plurality of secure elements that store the card emulation instance associated with the first AID,
identify a secure element from among the plurality of secure elements having a highest priority value from among the plurality of priority values, and
route communications between the second NFC device and the identified secure element to access the card emulation instance associated with the first AID.

18. The NFC device of claim 17, wherein the NFC module is further configured to identify the secure element having a next highest priority value from among the plurality of priority values when the secure element having the highest priority value is unavailable.

19. The NFC device of claim 17, wherein the NFC module comprises:
a memory that stores a plurality of look-up-tables (LUTs) having a plurality of AIDs, the plurality of priority values, and secure element information indicative of the plurality of secure elements in which the first AID is stored, each LUT from among the plurality of LUTs corresponding to a different AID from among the plurality of AIDs, and
wherein the NFC module is configured to identify the plurality of secure elements that store the card emulation instance using a LUT from among the plurality of LUTs that is associated with the first AID.

20. The NFC device of claim 17, wherein the plurality of card emulation instances comprises:
monetary transaction information;
electronic ticketing information;

security clearance information; or personal identification information.

21. The NFC device of claim 1, wherein the corresponding priority value for each of the plurality of card emulation instances is automatically set by the NFC device based upon a characteristic of a transaction between the NFC device and the second NFC device.

22. The NFC device of claim 21, wherein the characteristic comprises:

a time of day of the transaction;

a Global Positioning System (GPS) location of the NFC device; or a dollar amount of the transaction.

* * * * *